United States Patent
Jeon et al.

(10) Patent No.: US 10,373,347 B2
(45) Date of Patent: Aug. 6, 2019

(54) APPARATUS AND METHOD FOR CHANGING COLOR OF WEATHER PRESENTER'S COSTUME IN REAL TIME BASED ON WEATHER INFORMATION

(71) Applicant: INCHEON UNIVERSITY INDUSTRY ACADEMIC COOPERATION FOUNDATION, Incheon (KR)

(72) Inventors: Gwang Gil Jeon, Incheon (KR); Pyoung Won Kim, Anyang-si (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 11 days.

(21) Appl. No.: 15/711,906

(22) Filed: Sep. 21, 2017

(65) Prior Publication Data
US 2018/0286083 A1 Oct. 4, 2018

(30) Foreign Application Priority Data
Mar. 30, 2017 (KR) .................. 10-2017-0041065

(51) Int. Cl.
*G06T 7/90* (2017.01)
*G06T 11/00* (2006.01)

(52) U.S. Cl.
CPC .............. *G06T 11/001* (2013.01); *G06T 7/90* (2017.01); *G06T 2207/10024* (2013.01); *G06T 2210/64* (2013.01); *Y02A 90/14* (2018.01)

(58) Field of Classification Search
CPC ................................. H04N 9/75; H04N 5/262
(Continued)

(56) References Cited

U.S. PATENT DOCUMENTS 6,448,974 B1 * 9/2002 Asaro ................... G06T 11/001
345/591
2008/0174682 A1 * 7/2008 Faisman ................. G06T 11/00
348/239
(Continued)

FOREIGN PATENT DOCUMENTS

KR 20050030394 A 3/2005
KR 20070082195 A 8/2007
(Continued)

OTHER PUBLICATIONS

Kim, Pyoung Won, "Chameleon-like weather presenter costume composite format based on color fuzzy model". Soft Computing, vol. 22, No. 5, Mar. 2018, p. 1491-1500.*
Korean Patent Abstract (in English) of KR Patent No. 101676209 B1, Pub. Date Nov. 14, 2016, downloaded Sep. 2017 from https://worldwide.espacenet.com/.
(Continued)

*Primary Examiner* — Thomas J Lett
(74) *Attorney, Agent, or Firm* — Barcelo, Harrison & Walker, LLP

(57) ABSTRACT

Provided is an apparatus for changing a color of weather presenter's costume in real time based on weather information. The apparatus includes: a control unit configured to determine a color representing given weather information; and a color change unit configured to change a color of weather presenter's costume into the determined color. Accordingly, since the apparatus represents weather information through a color of weather presenter's costume, a viewer may intuitively grasp an overall weather condition through the weather presenter's costume.

12 Claims, 9 Drawing Sheets

(58) Field of Classification Search
USPC .......................................................... 345/595
See application file for complete search history.

(56) References Cited

U.S. PATENT DOCUMENTS

| | | | | |
|---|---|---|---|---|
| 2012/0236105 | A1* | 9/2012 | Alberth | G06T 19/006 348/14.07 |
| 2013/0271449 | A1* | 10/2013 | Lee | G06T 15/08 345/419 |
| 2015/0347823 | A1* | 12/2015 | Monnerat | G06K 9/00288 382/118 |
| 2016/0321547 | A1* | 11/2016 | Johnson | G06F 17/30 |

FOREIGN PATENT DOCUMENTS

| | | |
|---|---|---|
| KR | 100946202 B1 | 3/2010 |
| KR | 20160106438 A | 9/2016 |
| KR | 101676209 B1 | 11/2016 |

OTHER PUBLICATIONS

Korean Patent Abstract (in English) of KR Patent Pub No. 20070082195 A, Pub. Date Aug. 21, 2007, downloaded Sep. 2017 from https://worldwide.espacenet.com/.

Korean Patent Abstract (in English) of KR Patent Pub No. 20050030394 A, Pub. Date Mar. 30, 2005, downloaded Sep. 2017 from https://worldwide.espacenet.com/.

Office Action from Koren Intellectual Property Office for App. No. 10-2017-0041065, dated Mar. 21, 2018.

Korean Patent Abstract (in English) of KR Patent Pub No. 20160106438 A, Pub. Date Sep. 12, 2016, downloaded Apr. 5, 2018 from https://worldwide.espacenet.com/.

Korean Patent Abstract (in English) of KR Patent No. 100946202 B1, Pub. Date Mar. 9, 2010, downloaded Apr. 5, 2018 from https://worldwide.espacenet.com/.

Techniqued; "Solar Weather App for Android—Review"; published on YouTube on Jan. 1, 2014; access link https://www.youtube.com/watch?v=Ma5zD-ffXyw.

* cited by examiner

| | LINGUISTIC TERM | °C |
|---|---|---|
| VH | VERY HOT | 28~ |
| H | HOT | 24~32 |
| VW | VERY WARM | 20~28 |
| W | WARM | 16~24 |
| N | NORMAL | 12~20 |
| C | COOL | 8~16 |
| VC | VERY COOL | 4~12 |
| C' | COLD | 0~8 |
| VC' | VERY COLD | -4~4 |
| EC | EXTREMELY COLD | 0~ |

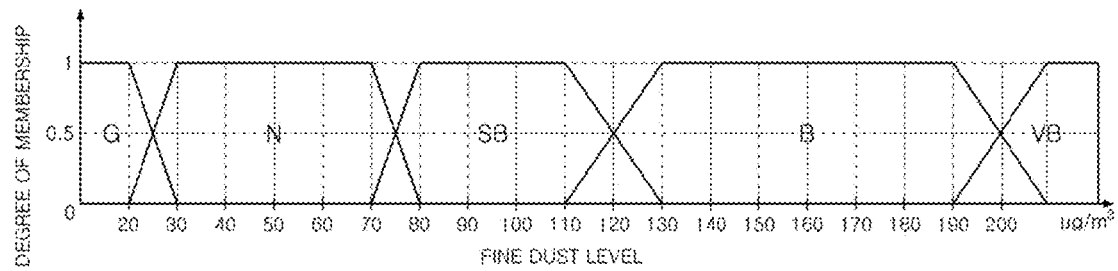
FIG. 5
| LINGUISTIC TERM | | μg/m³ |
|---|---|---|
| G | GOOD | 0~30 |
| N | NORMAL | 20~80 |
| SB | SLIGHTLY BAD | 70~130 |
| B | BAD | 110~210 |
| VB | VERY BAD | 190~ |
FIG. 6
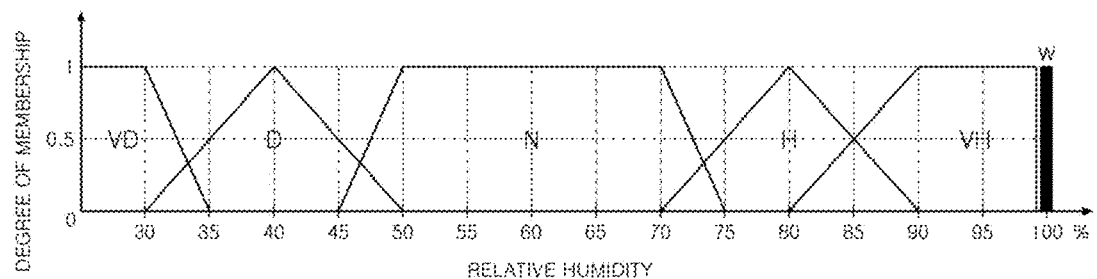
FIG. 7

| | LINGUISTIC TERM | °C |
|---|---|---|
| VD | VERY DRY | 0~35 |
| D | DRY | 30~50 |
| N | NORMAL | 45~75 |
| H | HUMID | 70~90 |
| VH | VERY HUMID | 80~100 |
| W | WET(RAIN) | 100 |

| COLOR | | LINGUISTIC TERM | HUE SPACE |
|---|---|---|---|
| | R | RED | 0~0.11π RAD |
| | O | ORANGE | 0.06~0.28π RAD |
| | Y | YELLOW | 0.22~0.44π RAD |
| | YG | YELLOW - GREEN | 0.39~0.61π RAD |
| | G | GREEN | 0.56~0.78π RAD |
| | GC | GREEN - CYAN | 0.72~0.94π RAD |
| | C | CYAN | 0.89~1.11π RAD |
| | CB | CYAN - BLUE | 1.06~1.28π RAD |
| | B | BLUE | 1.22~1.44π RAD |
| | BM | BLUE - MAGENTA | 1.39~2π RAD |

| COLOR | LINGUISTIC TERM | | SATURATION SPACE |
|---|---|---|---|
|  | VH | VERY HIGH SATURATION | 0.68~1 |
| | H | HIGH SATURATION | 0.54~0.75 |
| | N | NORMAL SATURATION | 0.25~0.61 |
| | L | LOW SATURATION | 0.11~0.32 |
| | VL | VERY LOW SATURATION | 0~0.18 |

| COLOR | | LINGUISTIC TERM | VALUE SPACE |
|---|---|---|---|
| | B | BRIGHT | 0.86~1 |
| | VH | VERY HIGH VALUE | 0.75~0.92 |
| | H | HIGH VALUE | 0.64~0.81 |
| | N | NORMAL VALUE | 0.42~0.69 |
| | L | LOW VALUE | 0.31~0.47 |
| | VL | VERY LOW VALUE | 0.08~0.36 |
| | D | DARK | 0~0.14 |

APPARATUS AND METHOD FOR CHANGING COLOR OF WEATHER PRESENTER'S COSTUME IN REAL TIME BASED ON WEATHER INFORMATION

CROSS-REFERENCE TO RELATED APPLICATIONS

This application claims the benefit of Korean Patent Application No. 10-2017-0041065, filed on Mar. 30, 2017, in the Korean Intellectual Property Office, the disclosure of which is incorporated herein in its entirety by reference.

BACKGROUND OF THE INVENTION

1. Field of the Invention

The present invention relates to an apparatus and a method for changing a color of weather presenter's costume in real time based on weather information.

2. Description of the Related Art

A television weather forecast is a popular program in which weather information announced by the meteorological office is effectively made more compact and suitable to the interest of viewers. A weather forecast has a format for maximizing information transmission in order to provide a brief summary about national weather, sea weather and weekly forecasts within a short time. Current television weather presenters, which are mainly women, are typically very attractive. The viewers concentrate more on the weather presenters rather than getting weather information. Surprisingly, gorgeous infographic and numerical information hinders the viewers from engaging.

The problems of current weather forecasts caused by the weather presenters are summarized as follows:

First, the femininity of the weather presenters is overemphasized. The current weather forecasts are represented in nonverbal factors such as gestures, facial expressions, and costumes, thus emphasizing the femininity of the weather presenters rather than professionalism. Like the fashion model, the weather presenter occupies about ⅓ of a screen, performs attractive gestures, and maintains a certain appearance. The viewers are inevitably immersed in characters rather than infographics.

Second, excessive computer graphics are used. Although realistic backgrounds may have aesthetic appeal, they are overly complex and irrelevant to contents and colorful graphic materials hinder the viewers from absorbing information. Too much or too little information does not help the viewers absorb information. In spite of high-quality infographics, the viewers who do not know what to concentrate on may miss real information.

Third, the weather forecast is centered on numerical data. Persons naturally express and recognize temperature, fine dust level, and relative humidity in terms of language, not numerical ones. For example, rather than expressing a temperature in response to a sensing temperature of 22° C., the persons generally express it as a "warm" feeling. Due to this tendency, emphasizing numerical data such as expected temperature (° C.), relative humidity (%), and precipitation (mm) may not effectively attract the viewers.

PRIOR ART DOCUMENTS

Patent Documents

Patent Document 1: KR 10-2017-0041065

SUMMARY OF THE INVENTION

One or more embodiments of the present invention include an apparatus for changing a color of weather presenter's costume in real time based on weather information, in which an emotional result representing an overall weather condition in color may be intuitively grasped through the weather presenter's costume.

One or more embodiments of the present invention include a method for changing a color of weather presenter's costume in real time based on weather information, in which an emotional result representing an overall weather condition in color may be intuitively grasped through the weather presenter's costume.

According to one or more embodiments of the present invention, an apparatus for changing a color of weather presenter's costume in real time based on weather information includes: a control unit configured to determine a color representing given weather information; and a color change unit configured to change a color of weather presenter's costume into the determined color.

The apparatus may further include a memory configured to store a color fuzzy model for representing weather information in color, wherein the control unit may determine a color representing given weather information based on the color fuzzy model.

Also, the weather information may include temperature, fine dust level, and relative humidity.

Also, the color fuzzy model may be based on an HSV color model in which a color is determined by hue, saturation, and value, the color fuzzy model may be to represent temperature, fine dust level, and relative humidity in corresponding hue, saturation, and value respectively, the control unit may determine hue, saturation, and value corresponding respectively to given temperature, fine dust level, and relative humidity based on the color fuzzy model, and the color change unit may change a color of weather presenter's costume into a color based on the determined hue, saturation, and value.

Also, the temperature may be represented in hue of the weather presenter's costume, the fine dust level may be represented in saturation of the weather presenter's costume, and the relative humidity may be represented in value of the weather presenter's costume.

Also, the memory may include: an input membership function including a temperature membership function, a fine dust level membership function, and a relative humidity membership function for respectively changing temperature, fine dust level, and relative humidity into linguistic variables perceived by humans; an output membership function including a hue membership function, a saturation membership function, and a value membership function for respectively representing the temperature, fine dust level, and relative humidity in hue, saturation, and value; and a predetermined fuzzy rule for matching the input membership function to the output membership function.

Also, the control unit may include: a fuzzy inference unit configured to infer a hue fuzzy set, a saturation fuzzy set, and a value fuzzy set corresponding respectively to given temperature, given fine dust level, and given relative humidity by matching the input membership function to the output membership function based on the predetermined fuzzy rule with respect to each of the given temperature, the given fine dust level, and the given relative humidity; and a defuzzification unit configured to determine a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set, and the color change unit may change a color of weather presenter's costume into a color based on the determined hue coordinate, saturation coordinate, and value coordinate.

Also, the color of the weather presenter's costume may be changed into the determined color in real time based on weather information provided by a weather presenter.

Also, a background color of a screen where the weather presenter appears may be changed into the determined color in real time based on the given weather information.

According to one or more embodiments of the present invention, a method for changing a color of weather presenter's costume in real time based on weather information includes: (A) determining a color representing given weather information; and (B) changing a color of weather presenter's costume into the determined color.

The method may further include, before the step (A), (C) forming a color fuzzy model for representing weather information in color, wherein the step (A) may include determining a color representing given weather information based on the color fuzzy model.

Also, the weather information may include temperature, fine dust level, and relative humidity.

Also, the color fuzzy model may be based on an HSV color model in which a color is determined by hue, saturation, and value, the step (C) may include forming a color fuzzy model for representing temperature, fine dust level, and relative humidity in corresponding hue, saturation, and value respectively, the step (A) may include determining hue, saturation, and value corresponding respectively to given temperature, fine dust level, and relative humidity based on the color fuzzy model, and the step (B) may include changing a color of weather presenter's costume into a color based on the determined hue, saturation, and value.

Also, the temperature may be represented in hue of the weather presenter's costume, the fine dust level may be represented in saturation of the weather presenter's costume, and the relative humidity may be represented in value of the weather presenter's costume.

Also, the step (C) may include: forming an input membership function including a temperature membership function, a fine dust level membership function, and a relative humidity membership function for respectively changing temperature, fine dust level, and relative humidity into linguistic variables perceived by humans; forming an output membership function including a hue membership function, a saturation membership function, and a value membership function for respectively representing the temperature, fine dust level, and relative humidity in hue, saturation, and value; and forming a predetermined fuzzy rule for matching the input membership function to the output membership function.

Also, the step (A) may include: inferring a hue fuzzy set, a saturation fuzzy set, and a value fuzzy set corresponding respectively to given temperature, given fine dust level, and given relative humidity by matching the input membership function to the output membership function based on the predetermined fuzzy rule with respect to each of the given temperature, the given fine dust level, and the given relative humidity; and determining a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set, and the step (B) may include changing a color of weather presenter's costume into a color based on the determined hue coordinate, saturation coordinate, and value coordinate.

Also, the color of the weather presenter's costume may be changed into the determined color in real time based on weather information provided by the weather presenter.

Also, a background color of a screen where the weather presenter appears may be changed into the determined color in real time based on the given weather information.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a diagram illustrating a membership function about fine dust level;

FIG. 6 is a table illustrating linguistic terms about fine dust level;

FIG. 7 is a diagram illustrating a membership function about relative humidity;

DETAILED DESCRIPTION

Description of the Preferred Embodiments

Figure 1:
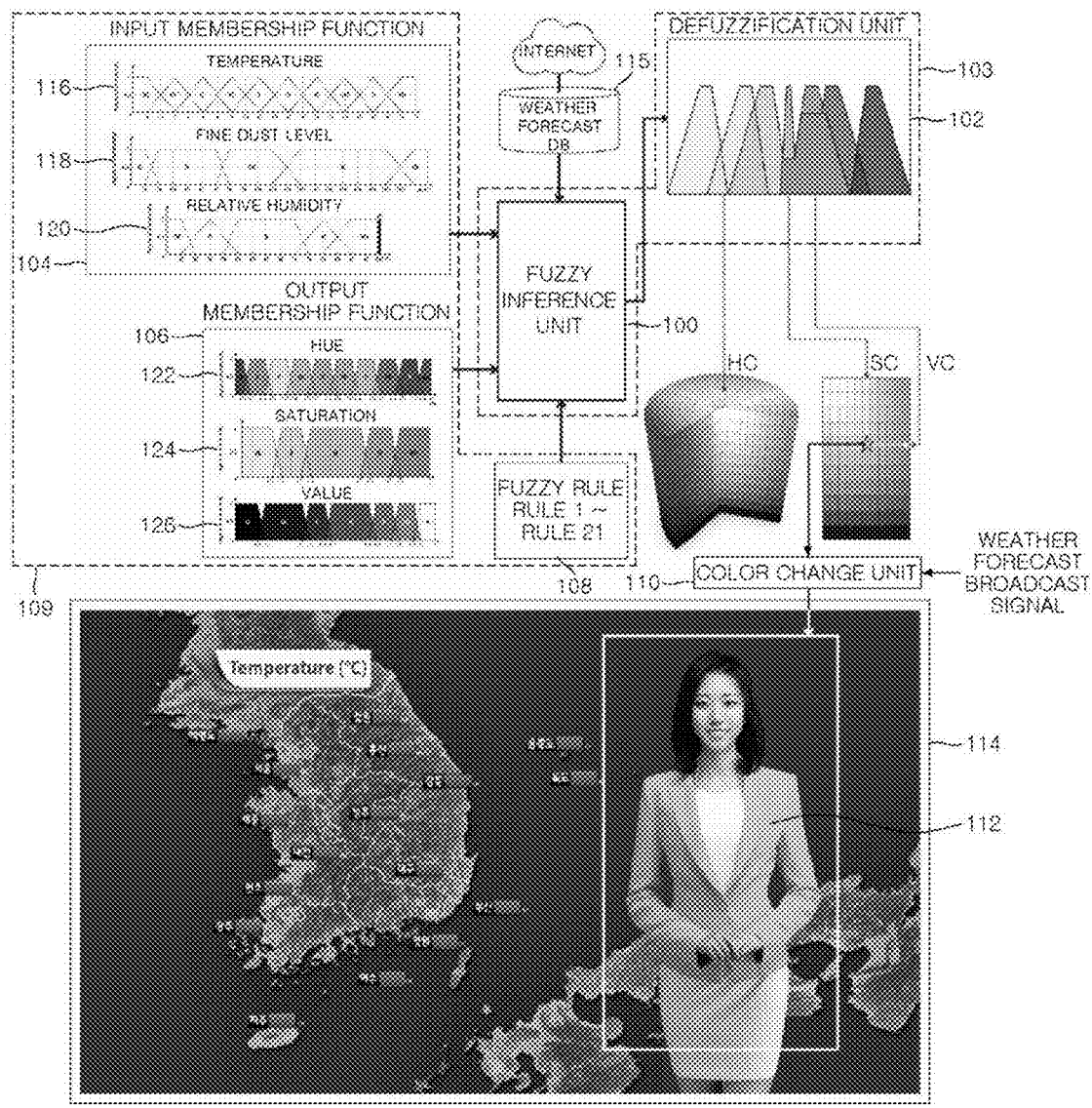
FIG. 1 is a block diagram of an apparatus for changing a color of weather presenter's costume in real time based on weather information, according to an embodiment of the present invention.

The above and other objects, features and other advantages of the present invention will be more clearly understood from the following detailed description of exemplary embodiments taken in conjunction with the accompanying drawings.

The terms or words used in the specification and claims are not limited to the general or bibliographical meanings, but are merely used by the inventor to enable a clear and consistent understanding of the present invention.

Like reference numerals may denote like elements throughout the specification.

Also, although the terms "first", "second", etc. may be used herein to describe various components, these components should not be limited by these terms. These terms are only used to distinguish one component from another component.

In the following description of the present invention, detailed descriptions of well-known functions or configurations will be omitted since they would unnecessarily obscure the subject matters of the present invention.

Hereinafter, exemplary embodiments of the present invention will be described in detail with reference to the accompanying drawings.

In an apparatus and method for changing a color of weather presenter's costume in real time based on weather information according to an embodiment of the present invention, overall weather information is transmitted emotionally and intuitively through the color of weather presenter's costume by using the fact that general persons recognize the same color as different colors depending on the degrees of darkness and lightness.

Specifically, in an apparatus and method for changing a color of weather presenter's costume in real time based on weather information according to an embodiment of the present invention, based on an HSV color model, by representing temperature through the hue of weather presenter's costume, representing fine dust level through the saturation of weather presenter's costume, and representing relative humidity through the value of weather presenter's costume, given overall weather information is emotionally and intuitively provided to a viewer.

Referring to FIG. 1, an apparatus for changing a color of weather presenter's costume in real time based on weather information according to an embodiment of the present invention includes a control unit 103 configured to determine a color representing given weather information from a weather forecast database (DB) 115, a color change unit 110 configured to change a color of weather presenter's costume into the determined color, and a memory 109 configured to store a color fuzzy model 104, 106, and 108 for representing weather information in color.

In an embodiment of the present invention, the weather information may include temperature, fine dust level, and relative humidity.

Also, the color fuzzy model is based on an HSV color model in which a color is determined by hue, saturation, and value, the color fuzzy model is to represent temperature, fine dust level, and relative humidity in corresponding hue, saturation, and value respectively, the control unit 103 determines hue, saturation, and value corresponding respectively to given temperature, fine dust level, and relative humidity based on the color fuzzy model, and the color change unit 110 changes a color of weather presenter's costume into a color based on the determined hue, saturation, and value.

The memory 109 includes an input membership function 104 including a temperature membership function 116, a fine dust level membership function 118, and a relative humidity membership function 120 for respectively changing temperature, fine dust level, and relative humidity into linguistic variables perceived by humans, an output membership function 106 including a hue membership function 122, a saturation membership function 124, and a value membership function 126 for respectively representing the temperature, fine dust level, and relative humidity in hue, saturation, and value, and a predetermined fuzzy rule 108 for matching the input membership function 104 to the output membership function 106.

The control unit 103 includes a fuzzy inference unit 100 configured to infer a hue fuzzy set, a saturation fuzzy set, and a value fuzzy set corresponding respectively to given temperature, given fine dust level, and given relative humidity by matching the input membership function 104 to the output membership function 106 based on the predetermined fuzzy rule 108 with respect to each of the given temperature, the given fine dust level, and the given relative humidity, and a defuzzification unit 102 configured to determine a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set.

Operations of the above apparatus for changing a color of weather presenter's costume in real time based on weather information according to an embodiment of the present invention will be described below.

Referring to FIG. 1, the fuzzy inference unit 100 receives numerical data of temperature, fine dust level, and relative humidity from weather forecast database 115 and respectively changes given temperature, given fine dust level, and given relative humidity into linguistic variables perceived by humans, based on the temperature membership function 116, the fine dust level membership function 118, and the relative humidity membership function 120.

Figures 3, 4:
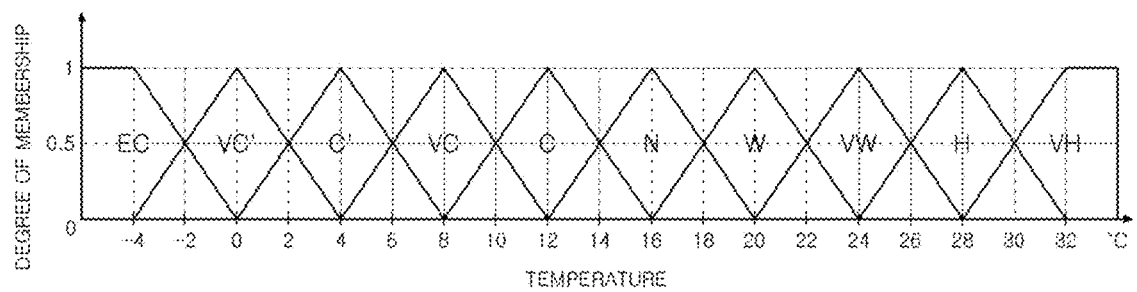
FIG. 3 is a diagram illustrating a membership function about temperature.
FIG. 4 is a table illustrating linguistic terms about temperature.

FIG. 3 is a diagram illustrating a membership function about temperature, and FIG. 4 is a table illustrating linguistic terms (linguistic variables) about temperature.

Referring to FIGS. 3 and 4, it may be seen that when the temperature is a numerical value of 18° C., the temperature is "NORMAL" (a degree of membership of 0.5) and "WARM" (a degree of membership of 0.5).

FIG. 5 is a diagram illustrating a membership function about fine dust level, and FIG. 6 is a table illustrating linguistic terms (linguistic variables) about fine dust level.

Referring to FIGS. 5 and 6, it may be seen that when the fine dust level is a numerical value of 120 μg/m$^3$, the fine dust level is "SLIGHTLY BAD" (a degree of membership of 0.5) and "BAD" (a degree of membership of 0.5).

Figures 8, 9:
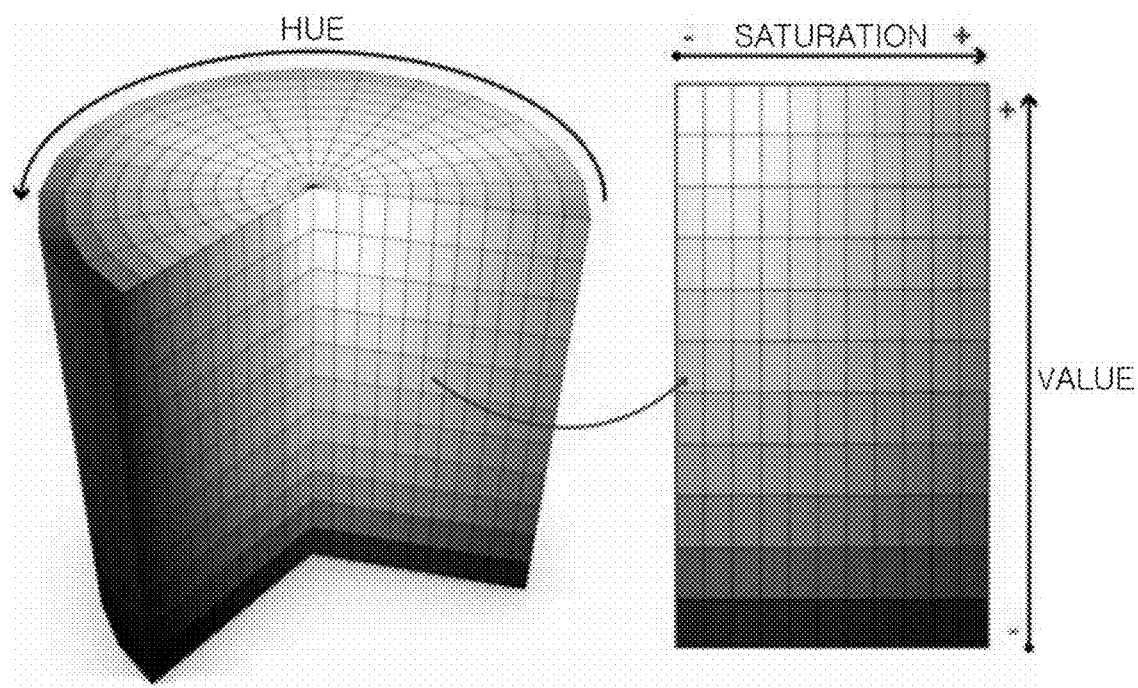
FIG. 8 is a table illustrating linguistic terms about relative humidity.
FIG. 9 is a diagram illustrating a cylindrical HSV color model.

FIG. 7 is a diagram illustrating a membership function about relative humidity, and FIG. 8 is a table illustrating linguistic terms (linguistic variables) about relative humidity.

Referring to FIGS. 7 and 8, it may be seen that when the relative humidity is a numerical value of 85%, the relative humidity is "HUMID" (a degree of membership of 0.5) and "VERY HUMID" (a degree of membership of 0.5).

Then, based on the predetermined fuzzy rule 108, the fuzzy inference unit 100 infers the hue fuzzy set corresponding to the temperature by matching the temperature membership function 116 and the hue membership function 122, infers the saturation fuzzy set corresponding to the fine dust level by matching the fine dust level membership function 118 and the saturation membership function 124, and infers the value fuzzy set corresponding to the relative humidity by matching the relative humidity membership function 120 and the value membership function 126.

Meanwhile, referring to FIG. 9, in a cylindrical HSV color model, the color is determined by the hue defined as an angle of 0° to 360° (or 0 rad to 2π rad) and the value and the saturation defined as 0% to 100% (or a real number of 0 to 1) to complement the hue.

Figures 10, 11:
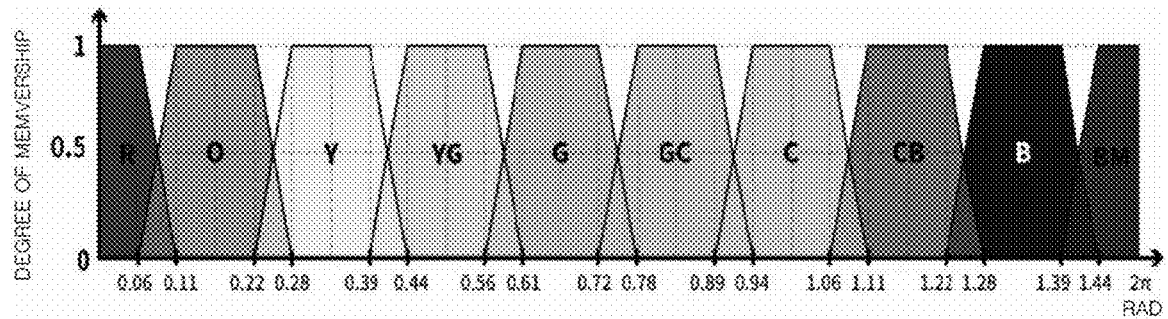
FIG. 10 is a diagram illustrating a membership function about hue.
FIG. 11 is a table illustrating linguistic terms about hue.

FIG. 10 is a diagram illustrating a membership function about hue, and FIG. 11 is a table illustrating linguistic terms (linguistic variables) about hue. The membership function about hue is acquired by matching the temperature and the hue in consideration of the human perception about WARM and COOL colors.

Figures 12, 13:
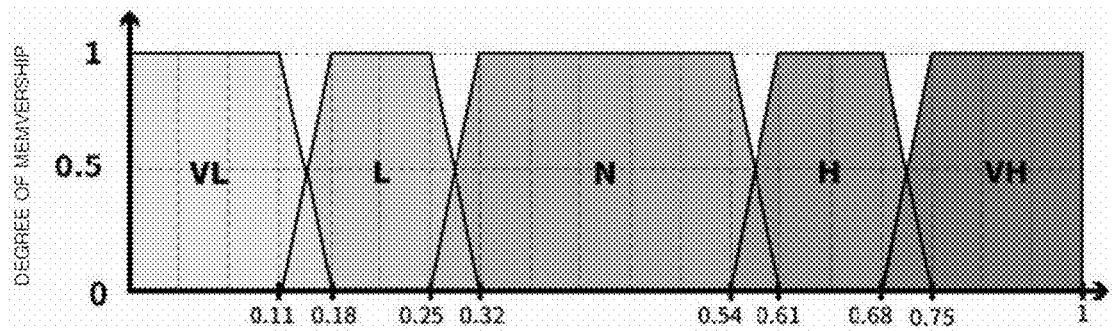
FIG. 12 is a diagram illustrating a membership function about saturation.
FIG. 13 is a table illustrating linguistic terms about saturation.

FIG. 12 is a diagram illustrating a membership function about saturation, and FIG. 13 is a table illustrating linguistic terms (linguistic variables) about saturation. The hue of color may be associated with the saturation of air. For this reason, it is useful to represent fine dust information in color saturation. For example, the fine dust level may be intuitively represented by reducing the saturation of color (that is, by making the color darker) as the fine dust level increases. In the HSV color model, the saturation is continuously distributed between 0 to 1 as represented by the membership function about saturation illustrated in FIG. 12.

Figures 14, 15:
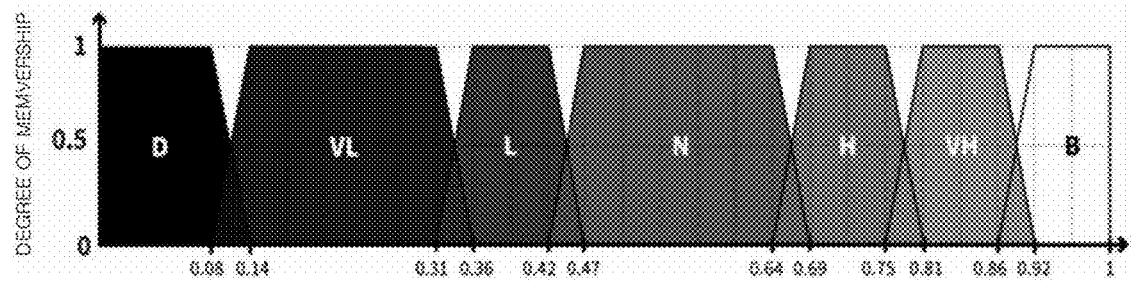
FIG. 14 is a diagram illustrating a membership function about value.
FIG. 15 is a table illustrating linguistic terms about value.

FIG. 14 is a diagram illustrating a membership function about value, and FIG. 15 is a table illustrating linguistic terms (linguistic variables) about value. The value may be associated with cloudy weather or sunny weather. Since the relative humidity is 100% in a rainy day, it may be represented in black color. For example, the fine dust level may be intuitively represented by reducing the value of color (that is, by making the color darker as gray series) as the relative humidity increases. In the HSV color model, the value is continuously distributed between 0 to 1 as represented by the membership function about value illustrated in FIG. 14.

Meanwhile, an example of the predetermined fuzzy rule 108 is as follows:

Rule 1: If [temperature] is [VERY HOT] then [the Hue] is [RED].
Rule 2: If [temperature] is [HOT] then [the Hue] is [ORANGE].
Rule 3: If [temperature] is [VERY WARM] then [the Hue] is [YELLOW].
Rule 4: If [temperature] is [WARM] then [the Hue] is [YELLOW.GREEN].
Rule 5: If [temperature] is [NORMAL] then [the Hue] is [GREEN]
Rule 6: If [temperature] is [COOL] then [the Hue] is [GREEN.CYAN].
Rule 7: If [temperature] is [VERY COOL] then [the Hue] is [CYAN].
Rule 8: If [temperature] is [COLD] then [the Hue] is [CYAN.BLUE].
Rule 9: If [temperature] is [VERY COLD] then [the Hue] is [BLUE].
Rule 10: If [temperature] is [EXTREMELY COLD] then [the Hue] is [BLUE.MAGENTA].
Rule 11: If [the fine dust level] is [GOOD] then [the saturation] is [VERY HIGH].
Rule 12: If [the fine dust level] is [NORMAL] then [the saturation] is [HIGH]
Rule 13: If [the fine dust level] is [SLIGHTLY BAD] then [the saturation] is [NORMAL]
Rule 14: If [the fine dust level] is [BAD] then [the saturation] is [LOW].
Rule 15: If [the fine dust level] is [VERY BAD] then [the saturation] is [VERY LOW].
Rule 16: If [the Relative Humidity] is [VERY DRY] then [the Value] is [VERY HIGH].
Rule 17: If [the Relative Humidity] is [DRY] then [the Value] is [HIGH].
Rule 18: If [the Relative Humidity] is [NORMAL] then [the Value] is [NORMAL]
Rule 19: If [the Relative Humidity] is [HUMID] then [the Value] is [LOW].
Rule 20: If [the Relative Humidity] is [VERY HUMID] then [the Value] is [VERY LOW].
Rule 21: If [the Relative Humidity] is [WET(Rain)] then [the Value] is [DARK].

The defuzzification unit 102 determines a hue coordinate (HC) corresponding to the given temperature, a saturation coordinate (SC) corresponding to the given fine dust level, and a value coordinate (VC) corresponding to the given relative humidity in the HSV color model by respectively defuzzifying the inferred hue fuzzy set, saturation fuzzy set, and value fuzzy set, for example, by using a defuzzification method using a center-of-gravity method.

The color change unit 110 changes a color of weather presenter's costume in a weather forecast broadcast signal into a color on the HSV color model based on the determined hue coordinate (HC), saturation coordinate (SC), and value coordinate (VC).

As above, according to the apparatus for changing a color of weather presenter's costume in real time based on weather information according to an embodiment of the present invention, the overall weather information may be emotionally and intuitively provided to the viewer by changing the color of weather presenter's costume, on which the viewer concentrates on, based on the given weather information.

Meanwhile, in the apparatus for changing a color of weather presenter's costume in real time based on weather information according to an embodiment of the present invention, the color of the weather presenter's costume may be changed into the determined color in real time based on the weather information provided by the weather presenter.

Figure 16:
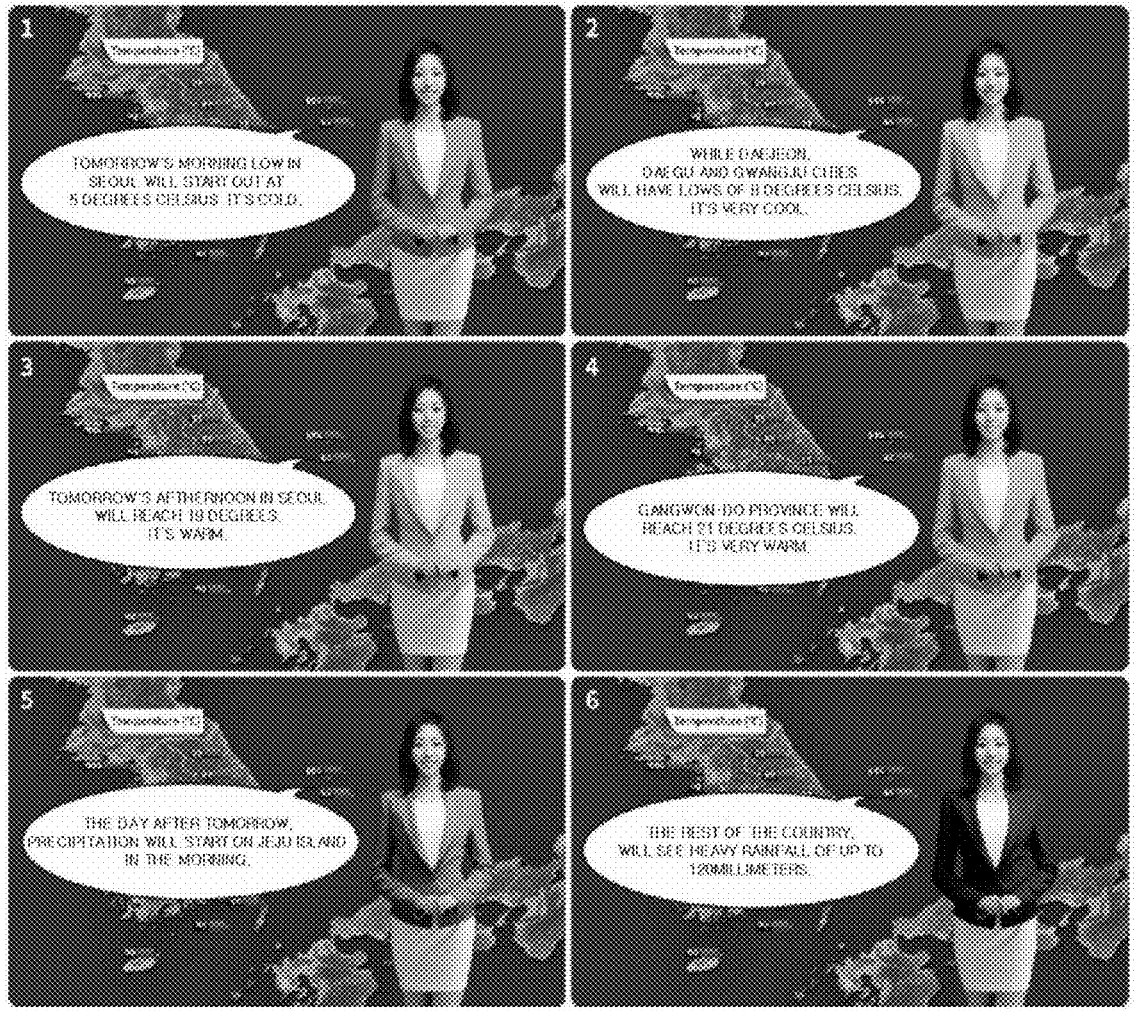
FIG. 16 is a diagram illustrating real-time costume composition of a weather presenter.

FIG. 16 is a diagram illustrating real-time costume composition of a weather presenter, and it may be seen that the hue of weather presenter's costume is changed in real time based on the temperature mentioned by the weather presenter and the value of weather presenter's costume is changed according to the precipitation, that is, the humidity.

Also, in the apparatus for changing a color of weather presenter's costume in real time based on weather information according to an embodiment of the present invention, not only the color of weather presenter's costume but also a background color of a screen where the weather presenter appears may be changed into the determined color in real time based on the given weather information.

Figure 2:
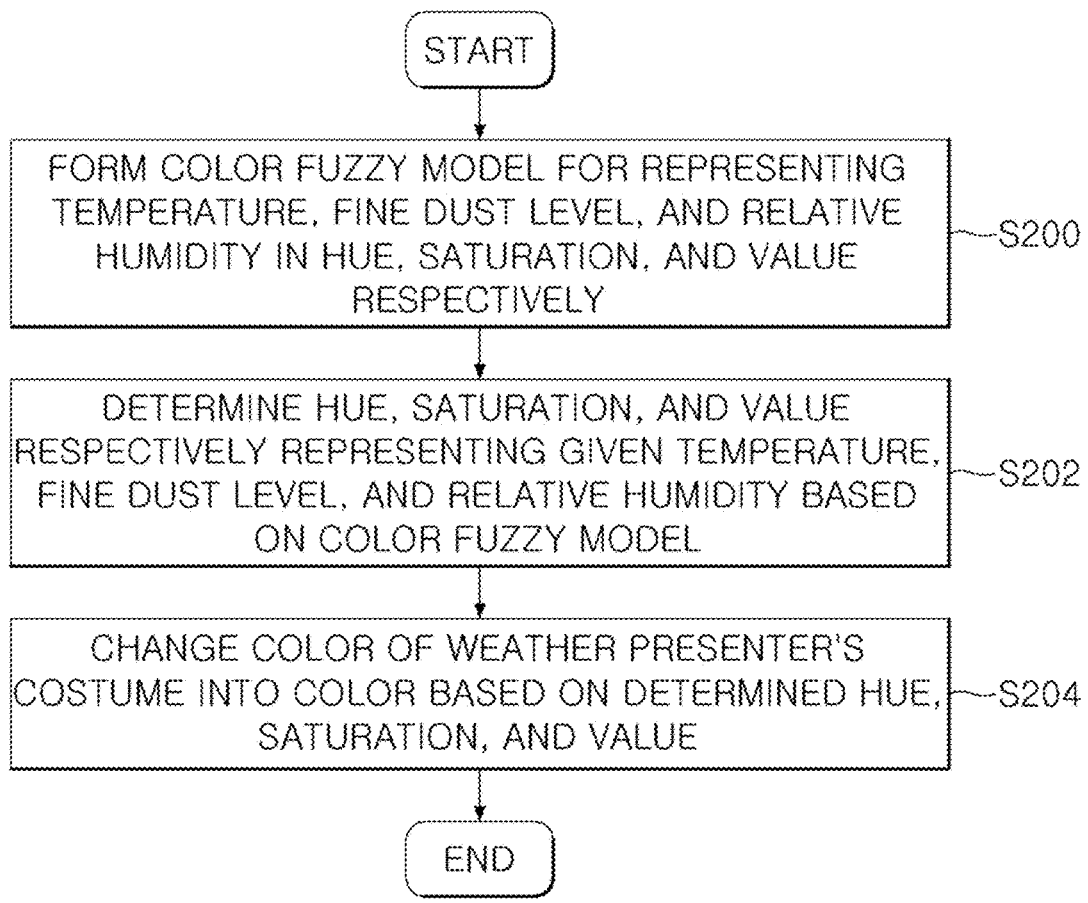
FIG. 2 is a flowchart of a method for changing a color of weather presenter's costume in real time based on weather information, according to an embodiment of the present invention.

Meanwhile, FIG. 2 is a flowchart of a method for changing a color of weather presenter's costume in real time based on weather information, according to an embodiment of the present invention.

Referring to FIG. 2, the method for changing a color of weather presenter's costume in real time based on weather information according to an embodiment of the present invention includes an operation S200 of forming a color fuzzy model for representing temperature, fine dust level, and relative humidity in corresponding hue, saturation, and value respectively, an operation S202 of determining hue, saturation, and value respectively representing given temperature, fine dust level, and relative humidity based on the color fuzzy model, and an operation S204 of changing a color of weather presenter's costume into a color based on the determined hue, saturation, and value.

In the method for changing a color of weather presenter's costume in real time based on weather information according to an embodiment of the present invention, the temperature may be represented in hue of the weather presenter's costume, the fine dust level may be represented in saturation of the weather presenter's costume, and the relative humidity may be represented in value of the weather presenter's costume.

The operation S200 includes an operation of forming an input membership function including a temperature membership function, a fine dust level membership function, and a relative humidity membership function for respectively changing temperature, fine dust level, and relative humidity into linguistic variables perceived by humans, an operation of forming an output membership function including a hue membership function, a saturation membership function, and a value membership function for respectively representing the temperature, fine dust level, and relative humidity in hue, saturation, and value, and an operation of forming a predetermined fuzzy rule for matching the input membership function to the output membership function.

The operation S202 includes an operation of inferring a hue fuzzy set, a saturation fuzzy set, and a value fuzzy set corresponding respectively to given temperature, given fine dust level, and given relative humidity by matching the input membership function to the output membership function based on the predetermined fuzzy rule with respect to each of the given temperature, the given fine dust level, and the given relative humidity, and an operation of determining a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set.

In the method for changing a color of weather presenter's costume in real time based on weather information according to an embodiment of the present invention, the color of the weather presenter's costume may be changed into the determined color in real time based on weather information provided by a weather presenter.

Also, in the method for changing a color of weather presenter's costume in real time based on weather information according to an embodiment of the present invention, a background color of a screen where the weather presenter appears may be changed into the determined color in real time based on the given weather information.

According to the apparatus and method for changing a color of weather presenter's costume in real time based on weather information according to an embodiment of the present invention, since weather information is represented through a color of weather presenter's costume, a viewer may intuitively grasp an overall weather condition through the weather presenter's costume.

Although the present invention has been described above in detail with reverence to particular embodiments, the present invention is not limited thereto and it will be understood by those of ordinary skill in the art that various modifications and improvements may be made therein without departing from the spirit and scope of the present invention.

Simple modifications or changes of the present invention are all included in the scope of the prevent invention, and the scope of the present invention will be defined by the accompanying claims.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. An apparatus for changing a color of weather presenter's costume in real time based on weather information: the apparatus comprising:
   a control unit configured to determine a color representing given weather information; and
   a color change unit configured to change a color of weather presenter's costume into the determined color, and
   a memory configured to store a color fuzzy model for representing weather information in color, wherein the control unit determines a color representing given weather information based on the color fuzzy model,
   wherein the weather information comprises temperature, fine dust level, and relative humidity, and
   wherein the color fuzzy model is based on an HSV color model in which a color is determined by hue, saturation, and value, the color fuzzy model is to represent temperature, fine dust level, and relative humidity in corresponding hue, saturation, and value respectively, the control unit determines hue, saturation, and value corresponding respectively to given temperature, fine dust level, and relative humidity based on the color fuzzy model, and the color change unit changes a color of weather presenter's costume into a color based on the determined hue, saturation, and value.

2. The apparatus of claim 1, wherein the temperature is represented in hue of the weather presenter's costume,
   the fine dust level is represented in saturation of the weather presenter's costume, and
   the relative humidity is represented in value of the weather presenter's costume.

3. The apparatus of claim 2, wherein the memory comprises:
   an input membership function comprising a temperature membership function, a fine dust level membership function, and a relative humidity membership function for respectively changing temperature, fine dust level, and relative humidity into linguistic variables perceived by humans;
   an output membership function comprising a hue membership function, a saturation membership function, and a value membership function for respectively representing the temperature, fine dust level, and relative humidity in hue, saturation, and value; and
   a predetermined fuzzy rule for matching the input membership function to the output membership function.

4. The apparatus of claim 3, wherein the control unit comprises:
   a fuzzy inference unit configured to infer a hue fuzzy set, a saturation fuzzy set, and a value fuzzy set corresponding respectively to given temperature, given fine dust level, and given relative humidity by matching the input membership function to the output membership function based on the predetermined fuzzy rule with respect to each of the given temperature, the given fine dust level, and the given relative humidity; and
   a defuzzification unit configured to determine a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set, and the color change unit changes a color of weather presenter's costume into a color based on the determined hue coordinate, saturation coordinate, and value coordinate.

5. The apparatus of claim 4, wherein the color of the weather presenter's costume is changed into the determined color in real time based on weather information provided by a weather presenter.

6. The apparatus of claim 5, wherein a background color of a screen where the weather presenter appears is changed into the determined color in real time based on the given weather information.

7. A method for changing a color of weather presenter's costume in real time based on weather information, the method comprising:
(A) determining a color representing given weather information; and
(B) changing a color of weather presenter's costume into the determined color, further comprising, before the step (A),
(C) forming a color fuzzy model for representing weather information in color,
wherein the step (A) comprises determining a color representing given weather information based on the color fuzzy model,
wherein the weather information comprises temperature, fine dust level, and relative humidity, and
wherein the color fuzzy model is based on an HSV color model in which a color is determined by hue, saturation, and value, the step (C) comprises forming a color fuzzy model for representing temperature, fine dust level, and relative humidity in corresponding hue, saturation, and value respectively, the step (A) comprises determining hue, saturation, and value corresponding respectively to given temperature, fine dust level, and relative humidity based on the color fuzzy model, and the step (B) comprises changing a color of weather presenter's costume into a color based on the determined hue, saturation, and value.

8. The method of claim 7, wherein the temperature is represented in hue of the weather presenter's costume,
the fine dust level is represented in saturation of the weather presenter's costume, and
the relative humidity is represented in value of the weather presenter's costume.

9. The method of claim 8, wherein the step (C) comprises:
forming an input membership function comprising a temperature membership function, a fine dust level membership function, and a relative humidity membership function for respectively changing temperature, fine dust level, and relative humidity into linguistic variables perceived by humans;
forming an output membership function comprising a hue membership function, a saturation membership function, and a value membership function for respectively representing the temperature, fine dust level, and relative humidity in hue, saturation, and value; and
forming a predetermined fuzzy rule for matching the input membership function to the output membership function.

10. The method of claim 9, wherein the step (A) comprises:
Inferring a hue fuzzy set, a saturation fuzzy set, and a value fuzzy set corresponding respectively to given temperature, given fine dust level, and given relative humidity by matching the input membership function to the output membership function based on the predetermined fuzzy rule with respect to each of the given temperature, the given fine dust level, and the given relative humidity; and
determining a hue coordinate corresponding to the given temperature, a saturation coordinate corresponding to the given fine dust level, and a value coordinate corresponding to the given relative humidity by respectively defuzzifying the inferred hue fuzzy set, saturation fuzzy set, and value fuzzy set, and
the step (B) comprises changing a color of weather presenter's costume into a color based on the determined hue coordinate, saturation coordinate, and value coordinate.

11. The method of claim 10, wherein the color of the weather presenter's costume is changed into the determined color in real time based on weather information provided by the weather presenter.

12. The method of claim 11, wherein a background color of a screen where the weather presenter appears is changed into the determined color in real time based on the given weather information.

* * * * *